_United States Patent_ [19]

Bivens

[11] Patent Number: 4,470,167

[45] Date of Patent: Sep. 11, 1984

[54] MULTIPLE BRUSH CARWASHER

[75] Inventor: David J. Bivens, Danville, Va.

[73] Assignee: Bivens Winchester Corporation, Danville, Va.

[21] Appl. No.: 435,587

[22] Filed: Oct. 20, 1982

[51] Int. Cl.³ .............................................. B60S 3/06
[52] U.S. Cl. ............................. 15/53 AB; 15/DIG. 2
[58] Field of Search ............. 15/DIG. 2, 21 D, 21 E, 15/53 R, 53 A, 53 AB, 97

[56] References Cited

U.S. PATENT DOCUMENTS

| 3,251,084 | 5/1966 | Larson et al. | 15/53 AB |
| 3,774,259 | 11/1973 | Genaro | 15/DIG. 2 X |
| 3,798,696 | 3/1974 | Cirino | 15/DIG. 2 X |
| 3,816,869 | 6/1974 | Ennig | 15/DIG. 2 X |
| 3,825,967 | 7/1974 | Takeuchi | 15/DIG. 2 X |
| 3,909,865 | 10/1975 | Scheuermann | 15/DIG. 2 X |
| 3,939,517 | 2/1976 | Bivens | 15/DIG. 2 X |
| 4,305,174 | 12/1981 | Pyle et al. | 15/DIG. 2 X |
| 4,320,551 | 3/1982 | Roncaglione | 15/DIG. 2 X |

_Primary Examiner_—Edward L. Roberts
_Attorney, Agent, or Firm_—Krass & Young

[57] ABSTRACT

A multiple brush vehicle washing apparatus wherein one brush has a horizontal axis of rotation and is pivotally mounted to swing in toward the rear surface of a vehicle which is passing under the brush support structure. A composite counter-weight system provides an angular force component which urges the brush into the rear of the vehicle at the lowermost brush position. A second horizontal brush and two angled side brushes are provided.

15 Claims, 7 Drawing Figures

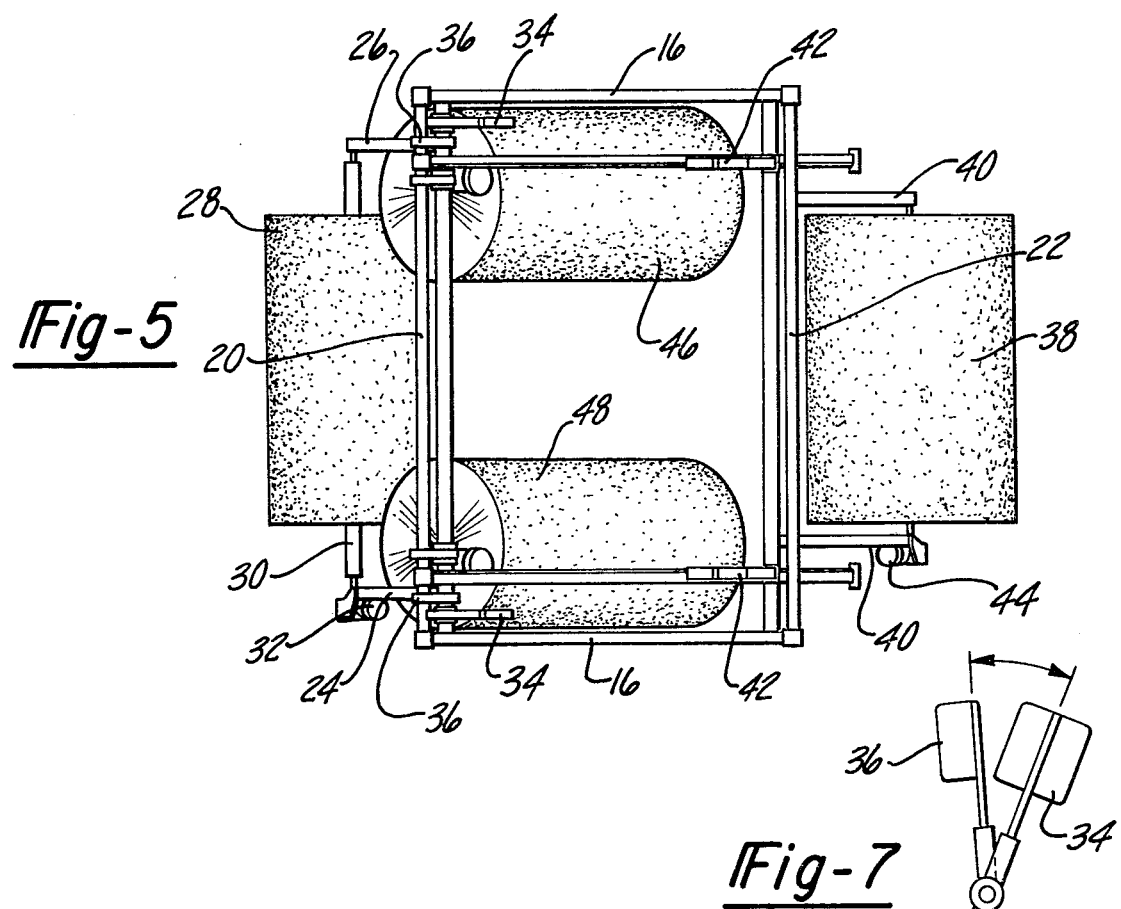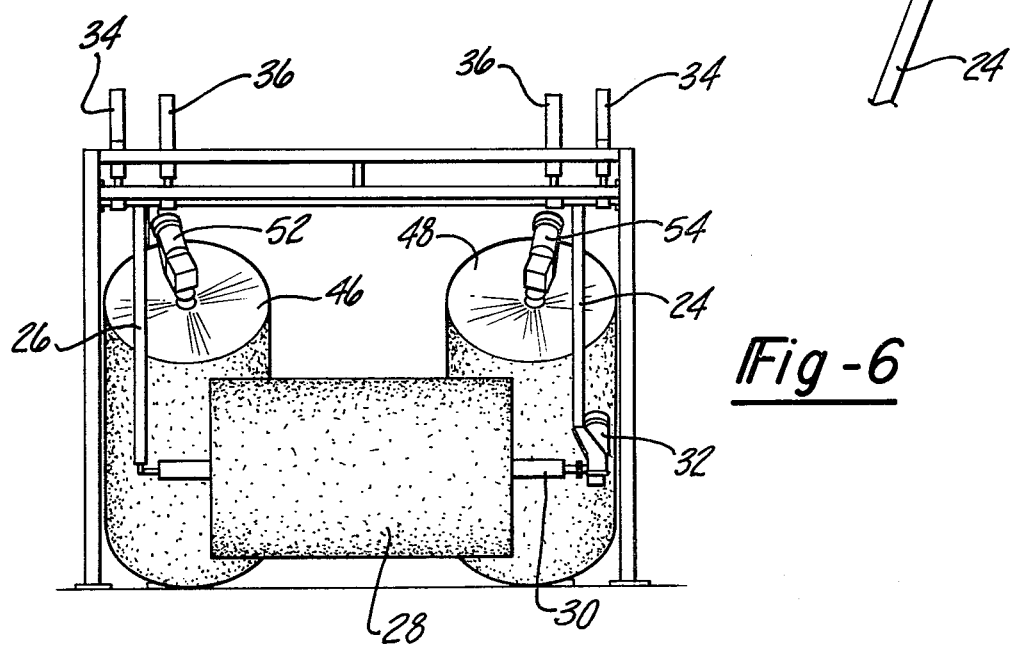

MULTIPLE BRUSH CARWASHER

DESCRIPTION

Introduction

This invention relates to vehicle washing apparatus of the rotating brush type and particularly to a vehicle washing apparatus having a pivotally-mounted horizontal brush which is capable of effectively washing the lower, rear surfaces of a vehicle.

BACKGROUND OF THE INVENTION

Vehicle washing systems typically comprise a combination of top and side brushes to contact and scrub all of the exterior surfaces of the vehicle as effectively as possible. In a typical arrangement the front surfaces of the vehicle are washed by one or more brushes having vertical axes of rotation and vertical pivot axes located to the sides of a wash lane. The brushes themselves stand in the path of the vehicle and are pushed through their angular range of travel by engagement with the vehicle. The brushes thereafter pass along the sides of the vehicle. A top brush, having a horizontal axis of rotation, is typically mounted with the pivot axis nearest the approaching vehicle so as to intercept the hood or windshield of the vehicle and be pushed up and over the vehicle as further relative motion occurs. This top brush is relatively incapable of washing the rearmost surfaces and particularly the lower, rearmost surfaces of the vehicle, because the brush is not permitted to fall to its lowermost position until the vehicle clears the brush and at this point the angular trajectory of the brush carries it away from the vehicle.

As a result, it is common to see personnel stationed near the entrance of a car washing establishment with brushes and buckets of soapy water for the purpose of manually washing down the rear surfaces and particularly the lowermost rear surfaces of the entering vehicles.

One approach to eliminating this need for a manual washing function is disclosed in U.S. Pat. No. 3,939,517 issued Feb. 4, 1976, to the present inventor. In that patent a horizontal brush is supported by an articulated frame the end portion of which can be pivotally extended forward in such a fashion as to reach out and scrub the rear surfaces of a receding vehicle. In addition, the horizontal brush may be shifted laterally to provide an additional scrubbing function. Although extremely effective, this approach does add to the technical complexity and cost of the system.

Another approach is described in U.S. Pat. No. 3,798,696 issued Mar. 26, 1974, to John F. Cirino. In this patent the horizontal brush is mounted on a pair of pivot arms with the pivot axis farthest from the approaching vehicle and with the brush extending toward the approaching vehicle. In this arrangement, the brush may pass downwardly over the rear window, deck, and lower rear surfaces of the vehicle, the angular path of travel being toward rather than away from the vehicle so as to permit contact to be maintained. It is recognized by the inventor that because the horizontal brush includes an axially symmetrical counterweight, the component of force tending to urge the brush against the vehicle diminishes to the point of negligibility toward the lowermost end of the angular path of brush travel. As a result, the system comprises an apparatus for manually applying additional force to the brush tending to maintain it in engagement with the vehicle at the lower end of its path.

BRIEF SUMMARY OF THE INVENTION

The principal object of the present invention is to provide a rotating brush-type carwasher wherein a horizontal brush is capable of following a vehicle over the top and rear surfaces thereof to contact and wash even the lowermost rear surfaces without the need for either the articulated frame as disclosed in U.S. Pat. No. 3,939,517, or the manual force applying system of U.S. Pat. No. 3,798,696. In general, this is accomplished in a vehicle washing apparatus of the type comprising a support frame, a rotatable, horizontal brush, left and right pivot arms pivotally connected to the frame and carrying the brush between the free ends thereof, the pivot point for the pivot arms and brush being farthest from the approaching vehicle, wherein the improvement comprises counterweight means attached to the pivot arms and arranged to provide first and second angularly spaced force components of which one such component is angularly positioned to urge the pivoted brush in the direction tending to follow the vehicle when the brush is in the lowered position.

In the preferred form, the aforementioned horizontal brush is one of a plurality of brushes mounted on a gantry-type support frame. In particular, the arrangement further comprises a second top brush for engaging the front surfaces of the vehicle and a pair of angled side brushes which are pivotally displaceable in and out relative to the center line of the wash lane thereby to accommodate vehicles of varying widths.

The invention may be best understood by referring to the following detailed description of a specific embodiment.

BRIEF DESCRIPTION OF THE DRAWINGS

FIG. 5 is a top view of the apparatus of FIG. 1;

FIG. 6 is an end view of the apparatus of FIG. 1; and

FIG. 7 is a detail of the counterweighting means used in combination with one of the top or horizontal brushes in the apparatus of FIG. 1.

DETAILED DESCRIPTION OF THE ILLUSTRATIVE EMBODIMENT

Figure 4:
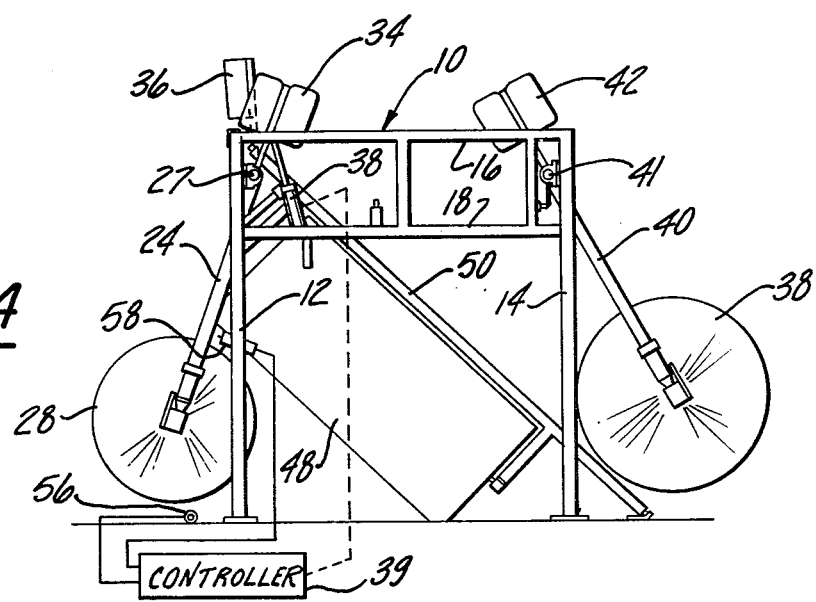
FIG. 4 is a side view of the apparatus of FIG. 1.

Referring to the drawings and particularly to FIGS. 4 through 6, a vehicle washing apparatus is shown to comprise a stationary frame 10 comprising two pairs of upright supports 12 and 14 based along and on opposite sides of a vehicle wash lane, the supports being interconnected by crossbeams 16 and 18 in the longitudinal direction and by crossbeams 20 and 22 in the lateral or transverse direction to provide a gantry or bridge over and on opposite sides of the wash lane capable of supporting the components hereinafter described.

Figure 1:
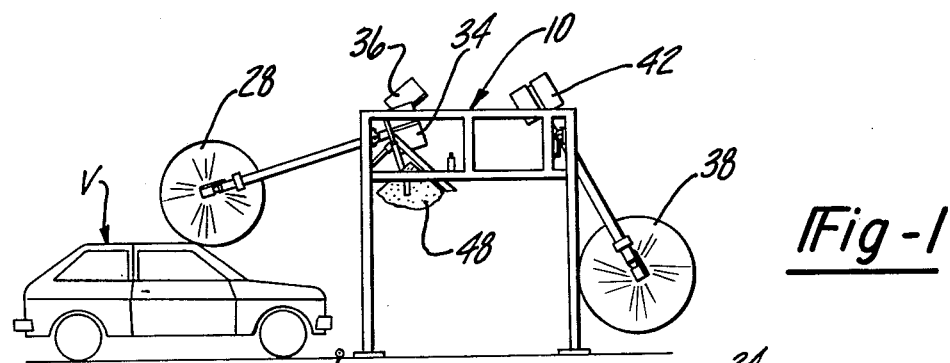
FIG. 1 is a diagrammatic drawing of a multiple brush vehicle washing apparatus embodying the invention and in a poised position to meet and engage an approaching vehicle.
Figure 2:
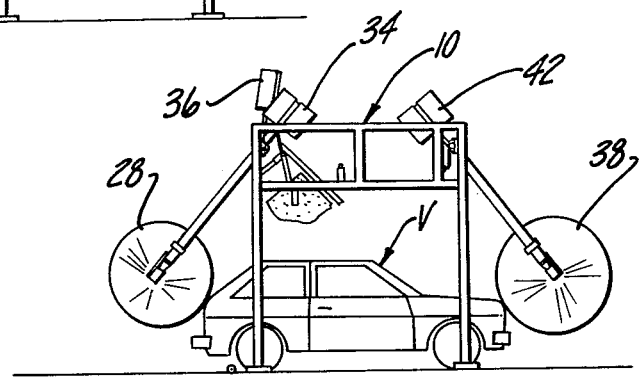
FIG. 2 is a diagrammatic drawing of the system of FIG. 1 with the vehicle in a more advanced position.
Figure 3:
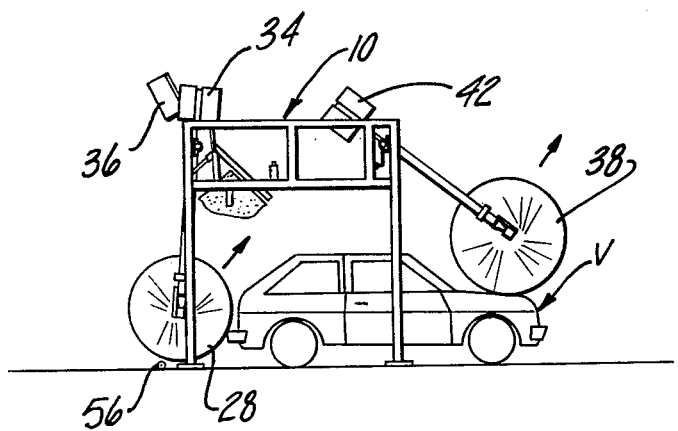
FIG. 3 is a diagrammatic drawing of the apparatus of FIG. 1 with the vehicle in a still more advanced position.

Pivot arms 24 and 26 are pivotally connected to the frame 10 at a raised axial location 27; i.e., above the normal height of vehicle V, and carry between their free ends a conventional plastic bristle carwashing brush 28 having a horizontal axle shaft 30 and powered by a motor and reduction drive combination 32 mounted near the end of the pivot arm 24. As indicated in FIGS. 1 through 3 the pivot location 27 for brush 28 is farthest from the approaching vehicle V such that the arms 24 and 26 extend toward the vehicle and the brush 28 is capable of rolling over the top of the vehicle and following the vehicle while remaining in engagement with the rear surfaces of the vehicle. A first set of counterweights 34 are connected to the pivot arms 24 and 26 at transversely spaced locations and in alignment with the pivot arms to provide a first component of counterweight force. A second set of counterweights 36 is also connected to the pivot ends of the arms 24 and 26 and these counterweights 36 are angularly spaced from the counterweights 34 by about 20° to provide a second component of counterweight force for purposes to be described.

Continuing with the general description of the apparatus, a second horizontal brush 38 is mounted on and between the free ends of pivot arms 40 which are connected to the frame 10 at pivot point location 41. Brush 38 is counterweighted by a single set of counterweights 42 aligned with the pivot arms 40. The brush 38 is rotated about its own horizontal axis by the means of a motor and reduction drive combination 44 of conventional character.

The apparatus further comprises a pair of angled side brushes 46 and 48 on opposite sides of the wash lane. As shown in FIG. 4, by way of example, an oblique angled support member 50 is welded into the frame 10 to support the brush 48 in a forwardly angled orientation to maximize the washing efficiency on the sides of the vehicle while at the same time minimizing potentially destructive force components on exterior vehicular accessories such as radio antennas. Brushes 46 and 48 are pivotally displaceable inwardly and outwardly of the centerline of the wash lane to accommodate vehicles of varying widths. Motor and reduction drive combinations 52 and 54 are mounted toward the top of the side brush arrangements 46 and 48 to rotate the brushes. All of the brushes are preferably of conventional long plastic strand or bristle construction.

Describing now the operation of the apparatus shown in the drawings, particular reference will be made to FIGS. 1 through 3. An air cylinder 38 having a controller 39 operating under the control of a hose switch 56 which extends across the wash lane and a limit switch 58 mounted on the support 12 of the frame 10 initially lifts brush 28 to the poised position shown in FIG. 1. All of the other brushes 38, 46, and 48 operate automatically and without motive power means for positioning purposes.

The vehicle V approaches the washing apparatus along a wash lane which is positioned to carry the vehicle through the frame 10; i.e., between the vertical supports 12 and 14 and under the horizontal crossbeams 22. Brush 28 is preferably positioned in a location to just clear or perhaps provide some small degree of engagement with the roof of the vehicle in the poised position. Just before entering the frame 10, vehicle runs over the hose switch 56 and causes controller 39 and cylinder 38 to release the brush 28 to fully engage the top of the vehicle. The vehicle V progresses into and through the frame 10 to the position shown in FIG. 2 where the front surface of the vehicle now engages the second horizontal brush 38 to wash the front bumper, headlights, grille, and other forward surfaces and elements of the vehicle. The horizontal brush 28 is swinging downwardly and inwardly toward the center of the frame 10 to pass down over the rear window of the vehicle and the lowermost rear surfaces of the vehicle, the angular trajectory of the brush 28 being such as to permit it to follow the vehicle into and through the frame 10 to a considerable degree as hereinafter described.

Meanwhile, side brushes 46 and 48 have self-adjusted to the width of the vehicle V and are washing the side surfaces of the vehicle in a known fashion. Window brushes and tire brushes may be provided as desired.

Brush 28 follows the vehicle V to a near vertical position as shown in FIG. 3 so as to engage and scrub the lowermost rear surfaces of the vehicle, including the rear bumper. Whereas with only counterweights 34, the force provided by counterweight 34 tending to engage the brush 28 with the vehicle would be diminished to the point of negligibility in the position shown in FIG. 4, the second angularly spaced counterweight 36 now provides a strong moment or force tending to rotate or force the brush 28 and the pivot arms 24 and 26 toward the vehicle V and the frame 10. A mechanical stop and a limit switch arrangement 58 are provided for delimiting the extent of travel of brush 28 and pivot arms 24 and 26 into the frame 10; i.e., when the pivot arm 24 reaches the limit switch 58, the cylinder 38 is again actuated to raise the brush 28 to the poised position of FIG. 1.

It can be seen that, because of the angular spacing between the counterweights 34 and 36, the moment or angular force exerted tending to pivot the brush 28 follows a complex or composite pattern; i.e., when the angular position of the arms 24 and 26 is such as to extend the counterweight 36 substantially vertically, no force component derives from counterweight 36 and all of the counterweighting effect is produced by counterweight 34. The net or resultant counterweighting moment is clockwise when viewing the apparatus from the vantage point represented in FIGS. 1 through 4, and 7. When the pivot arms 24 and 26 take the angular position corresponding with the lowermost position of the brush 28, the counterweight 34 is nearly vertical and provides relatively little angular force tending to pivot the brush 28. However, at the same position the counterweight 36 has traveled beyond center and provides a counterclockwise moment on the pivot arms 24 and 26 tending to cause the brush 28 to follow the vehicle V into the frame 10. As will be apparent to those skilled in the mechanic arts of this composite, function cannot be provided by a counterweight which is symmetrical or centered about the longitudinal axis of the pivot arms 24 and 26.

The angular spacing between the counterweights 34 and 36 is approximately 20° to 25° in the embodiment shown in the drawings. However, this angular spacing may be adjusted in accordance with the total desired angular travel of the brush 28 on the ends of the pivot arms 24 and 26. Similarly the sizes of the counterweights 34 and 36 will be varied in accordance with the size and weight of the brush 28, the axle shaft 30, the motor and gear box 32, and the physical characteristics of the bristles which make up the brush 28.

Although shown and described with reference to a drive-through carwash wherein the frame 10 is stationary and fixed in position relative to the wash lane, the features and advantages of the invention are equally applicable to a roll-over washer wherein the frame 10 comprises wheels which engage longitudinal tracks so as to permit the apparatus to be moved back and forth while the vehicle being washed remains stationary.

Additionally, while weights 34 and 36 may be combined and centrally located between the pivot arms, the distributed and laterally outboard arrangement is preferred as it reduces the amount of weight which must be handled by the installer, reduces or eliminates torsional windup of the cross shafts, and eliminates the possibility of a weight coming loose and falling on a vehicle.

I claim:

1. In a vehicle washing apparatus of the type comprising a support frame proximate a washing area, a rotatable horizontal brush, first and second laterally spaced pivot arms pivotally connected to the frame and carrying the brush between the free ends thereof to be pivotally displaceable from a poised position wherein the arms and brush are raised above and extend toward an approaching vehicle to a lowered position wherein the arms extend substantially vertically and the brush is in a lowermost position, the improvement which comprises:

counterweight means attached to said arms and having first and second angularly spaced force components of which one component is positioned to increasingly urge the brush in the direction tending to follow the vehicle into the washing area and remain in contact with the rearmost surfaces of the vehicle as the brush approaches the lowermost position.

2. Apparatus as defined in claim 1 further including power means to raise the horizontal brush from the lowered position to the poised position.

3. Apparatus as defined in claim 2 further including switch means actuated by an approaching vehicle and operating the power means to release the horizontal brush from the poised position into engagement with the vehicle.

4. Apparatus as defined in claim 3 further including second switch means for actuating the power means when the brush reaches the lowermost position to raise the brush to the poised position.

5. Apparatus as defined in claim 1 wherein said counterweight means comprises at least a first counterweight connected to one of the pivot arms and in axial alignment therewith and at least a second counterweight connected to one of the pivot arms and substantially angularly displaced from the first counterweight in the angular direction of pivot arm travel from the poised position toward the lowermost position.

6. Apparatus as defined in claim 1 further comprising a second horizontal brush pivotally mounted to said support frame in reversely similar operational orientation to the first brush and longitudinally spaced therefrom along the washing area.

7. Apparatus as defined in claim 6 further including a pair of laterally opposite side brushes mounted on a support frame for engaging and scrubbing the side surfaces of a vehicle.

8. Apparatus as defined in claim 7 wherein the longitudinal axis of said side brushes are substantially angularly spaced relative to the vertical.

9. Apparatus as defined in claim 1 wherein said frame comprises a plurality of upright support members on opposite sides of the washing area and a plurality of horizontal cross frame members rigidly joining the vertical frame members.

10. Apparatus as defined in claim 9 wherein the said support frame is fixed relative to the washing area.

11. Apparatus as defined in claim 1 further including power means for rotating the horizontal brush about a horizontal axis.

12. Vehicle washing apparatus comprising:
a frame of sufficient height and width to accommodate an automotive vehicle both laterally and vertically there within;
a first scrubber means having a vehicle-contacting portion with a substantially horizontal axis of rotation and a pair of support arms carrying the vehicle-contacting portion and being pivotally mounted on one end of the frame to swing in a horizontal plane;
a second scrubber means having a vehicle-contacting portion with a substantially horizontal axis of rotation and a pair of support arms carrying the vehicle-contacting portion and being pivotally mounted on the opposite end of the frame to swing in a horizontal plane; the first and second vehicle contacting scrubber means swinging in reversely opposite fashion; and
third and fourth laterally opposite vehicle contacting scrubber rotationally mounted on laterally opposite sides of said frame for scrubbing the sides of a vehicle moving relative to said frame.

13. Apparatus as defined in claim 12 wherein the axes of rotation of said third and fourth scrubber means are angled between horizontal and verticle.

14. Apparatus as defined in claim 12 wherein said frame is stationarily mounted on a support surface.

15. Apparatus as defined in claim 12 further including operating means to raise and lower the first scrubber means by swinging motion relative to said frame.

* * * * *

UNITED STATES PATENT AND TRADEMARK OFFICE
CERTIFICATE OF CORRECTION

PATENT NO. : 4,470,167
DATED : September 11, 1984
INVENTOR(S) : David J. Bivens

It is certified that error appears in the above-identified patent and that said Letters Patent are hereby corrected as shown below:

Please cancel claims 12, 13, 14 and 15.

Signed and Sealed this

Fourteenth Day of May 1985

[SEAL]

Attest:

DONALD J. QUIGG

Attesting Officer     Acting Commissioner of Patents and Trademarks